United States Patent [19]

Koller et al.

[11] 4,354,055

[45] Oct. 12, 1982

[54] DEVICE FOR TELETYPEWRITERS FOR THE DEPOSIT OF SHEET-TYPE RECORDING MEDIA

[75] Inventors: Peter Koller, Munich; Ulrich Mayr, Germering, both of Fed. Rep. of Germany

[73] Assignee: Siemens Aktiengesellschaft, Berlin & Munich, Fed. Rep. of Germany

[21] Appl. No.: 234,387

[22] Filed: Feb. 13, 1981

[30] Foreign Application Priority Data

Feb. 29, 1980 [DE] Fed. Rep. of Germany ....... 3007838

[51] Int. Cl.[3] ........................ H04L 15/24; B65H 5/00

[52] U.S. Cl. ........................................ 178/42; 271/225

[58] Field of Search .................. 178/42; 235/475, 483; 271/109, 225, 264, 306, 307, 311, 313, 184, 189, 314, 207, 2, 3, 4, DIG. 2

[56] References Cited

FOREIGN PATENT DOCUMENTS 2854695 7/1979 Fed. Rep. of Germany .

2856950 10/1979 Fed. Rep. of Germany .

*Primary Examiner*—Thomas A. Robinson

*Attorney, Agent, or Firm*—Hill, Van Santen, Steadman, Chiara & Simpson

[57] ABSTRACT

The invention relates to apparatus for use in printing devices for the deposit of sheet-type recording media transported across a platen into a deposit tray area disposed above the platen. Deposit of the sheets is carried out by means of transport or delivery rollers which seize each sheet after it has passed through a printing area adjacent the platen and lift the sheet over a lower edge of the deposit tray for stacking. A pivotally mounted common carrier bracket is provided to carry a support wall which forms the lower edge surface of the deposit tray and the transport roller means. The support wall has a stripper surface formed along one end thereof containing bias means for resiliently pressing the recording medium into driving engagement against the transport rollers. The other end of the support wall is formed with intake guide surfaces for leading sheets into engagement with the intake side of the platen. The carrier bracket is pivotally rotatable so as to enable an operator easy access to the sheet feed path and the platen.

9 Claims, 2 Drawing Figures

DEVICE FOR TELETYPEWRITERS FOR THE DEPOSIT OF SHEET-TYPE RECORDING MEDIA

BACKGROUND OF THE INVENTION

1. Field of the Invention

The invention relates to an improved arrangement for use in printing devices whereby recording medium sheets are transported across a platen for deposit into a tray area disposed above the platen via transport rollers which seize the recording medium after it has passed through the printing area and lift it over a lower wall bounding the lower edge of the deposit tray.

2. The Prior Art

Printing device feeders for transporting recording medium through a printing area and into a deposit tray are well-known in the art. One such sheet transport system is disclosed in German OS 2854695. There, recording medium is automatically fed from a supply box via frictional engagement with feed rollers drivingly connected to the platen and disposed in the conveyance path of the sheets leading to the printing area. The feed rollers withdraw the media sheet-by-sheet from the supply box and direct each sheet into wrap-around engagement with the platen. After the platen has passed the sheet through the printing area, two transport rollers, driven via the platen, seize the recording medium and raise the sheet upward for deposit in a stack in a deposit tray. This prior art arrangement is relatively complicated, requiring, for example, a special format for stacking the individual sheets. The sheets for feeding must be deposited in the form of a stack of sheets in the supply box.

The present invention provides a transport arrangement for sheet-type recording media, particularly useful for teletypewriters, which enables both automatic and manual feeding of individual sheets to a printing platen and allows each sheet to be securely guided past the printing area and reliably stacked in a deposit tray in a simplified and readily serviceable construction.

SUMMARY OF THE INVENTION

A common carrier bracket is pivotally mounted adjacent a printer platen for supporting thereon a support wall member and transport roller means to deliver sheet-type recording media into a deposit tray. The support wall is formed along one leading edge with a stripper surface for directing the sheets into driving engagement with the transport rollers. A bias means is disposed at the stripping surface for resiliently pressing the sheets against the transport rollers. The opposed end of the supporting wall is formed with an intake guidance surface for directing sheets to the lead-in side of the platen. An intake channel is formed between an edge surface of the deposit tray base wall and the guidance surface to permit manual introduction of individual recording medium sheets from the deposit tray area. Formed on the other side of this base wall is a pathway for directing sheets to the platen from an automatic sheet feed mechanism.

By virtue of the pivotal movement of the carrier bracket, it is possible to readily access the platen area to relieve sheet feed disruptions or replace the platen as needed.

Thus, in accordance with the present invention, individual sheets may be supplied for transport about the platen either by hand or by an automatic sheet feed device independently of the format size. With the inventive arrangement, the sheets can be transported through the printing area and then purposely deposited in stack relation in a deposit tray. By providing for the pivotal movement of the carrier bracket and, in addition, relative pivotal movement of the transport roller means into and out of the path of the recording medium, operator adjustments with the sheet transport system are made readily possible in simplified fashion.

DESCRIPTION OF THE PREFERRED EMBODIMENTS

Figure 1:
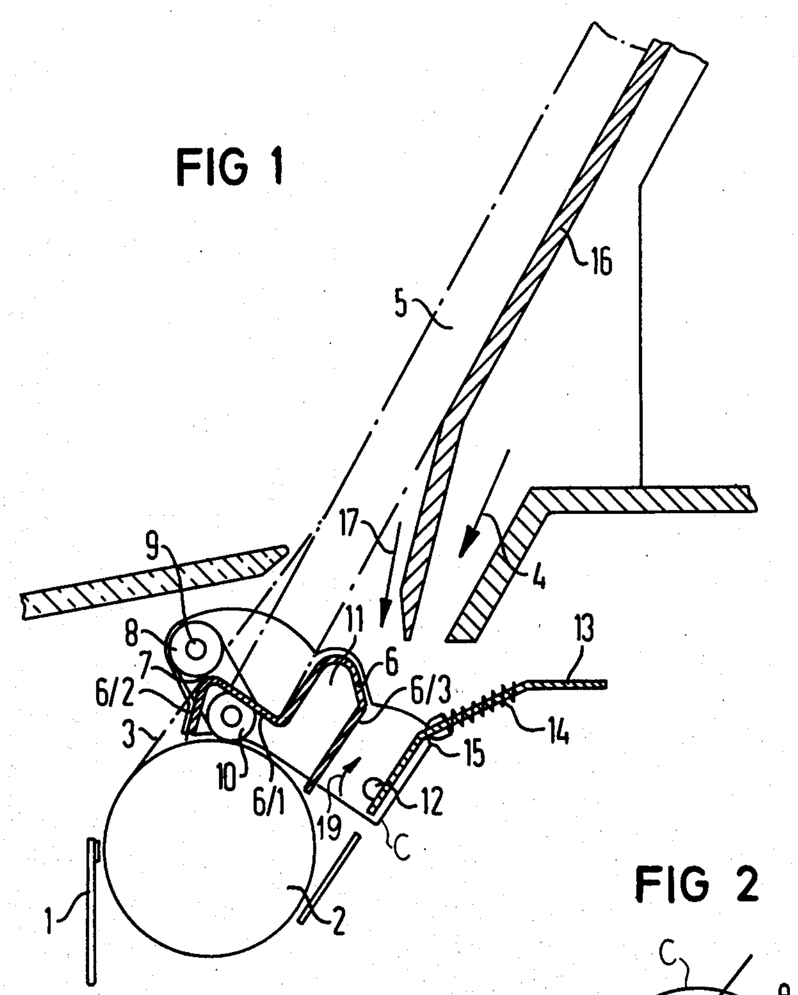
FIG. 1 is a partly schematic cross-sectional side elevational view of the sheet deposit arrangement for use in a printer device in accordance with the present invention.

FIG. 1 illustrates a teletypewriter arrangement utilizing the apparatus of the present invention. A recording medium 3 in the form of individual sheets is being directed over a rotary platen 2 through a printing area where the recording medium is printed in line-by-line fashion by means of a type arm 1. The recording medium may be supplied individually sheet-by-sheet through a feed channel indicated by arrow 4 for passage along the platen 2 by means of an automatic sheet feed mechanism (not shown). After being printed, each sheet 3 is then delivered into a deposit stack 5 disposed in a deposit tray area located above the platen.

The recording medium sheets 3 are delivered for stacking into the deposit tray by means of an automatic sheet deposit arrangement constructed in accordance with the present invention. The automatic sheet deposit device contains a continuous support strip or wall member 6 which is held between two side face surfaces 11 forming a carrier bracket C. The support wall is formed with a generally flat ledge surface 6/1 serving as the lower wall for the deposit tray. The lead end of the support wall 6 is formed with a stripper edge surface 6/2 for accepting and guiding recording medium 3 conducted around the platen 2. The other end of the support wall is shaped with an intake guide surface 6/3 for conducting recording medium sheets to the intake side of the platen.

A bias means 7, which can be, for example, resilient finger members or undulating ridges, as shown in FIG. 1, extending from the support wall 6 and integrally formed on an edge surface of the support wall 6, is disposed in the area of the stripper surface 6/2 to press recording medium extending from the platen after passage through the printing area against transport roller means 8 for delivery onto the deposit stack 5. The transport roller means 8 is mounted on the carrier bracket C and comprises a plurality of rollers disposed on a common shaft 9. The rollers 8 are driven via drive connections such as belts or toothed wheels from driving roller means 10, which are supported on the carrier C in frictional driving engagement with the platen 2.

The carrier bracket C is pivotally mounted on an axle 12 supported in a manner not shown in the housing of the teletypewriter. The axle support permits the carrier bracket C to be pivoted in the direction of arrow 19 from its at rest or operating position illustrated in FIG. 1. In its position shown in FIG. 1, the carrier bracket C is supported at its end containing the transport and driving rollers 8 and 10 by virtue of the supporting wall surface 6/1 resting on means adjacent the drive rollers 10. A releasable locking means arrests the carrier bracket C against pivotal movement in the direction of arrow 19. The locking means comprises spring-biased catch elements 14 extending from a housing plate 13 which engage with cooperatively arranged stop surfaces 15 formed along a lateral edge of the carrier bracket C. By virtue of the pivotal mounting of the carrier bracket, it is readily possible to pivot the carrier bracket out of the flow path of recording medium about the platen 2 enabling an operator to attend to disruptions in sheet feed or to replace the platen 2 as needed.

In operation, the sheets 3 are individually directed into a sheet feed channel indicated by arrow 4 for passage into driving engagement with the intake side of the platen 2. The platen 2 seizes the individual sheets and conducts them past the printer arms or wheels 1 for line-by-line printing thereon. After passage through the printing area, the sheet 3 then strikes against the stripper surface 6/2 of the support wall 6, where the sheet is directed upward towards driving engagement with the transport rollers 8. The bias elements 7 maintain the sheet in driving contact with the transport rollers 8. By means of continued actuation of the platen 2, the sheet 3 is lifted up over the ledge surface 6/1 of the support wall for deposit onto the stack 5 assembled in the deposit tray. The individual sheets thereby lie flat against a base wall surface 16 designed as a paper support in the deposit tray.

At the lower end of the base wall surface 16, there is formed a feed channel opening between the support wall 6 and an opposed surface of the base wall for the introduction of individual sheets in the direction of arrow 17. Thus, when the automatic sheet feed mechanism is not being utilized, it is possible to manually direct individual sheets 3 to the intake side of the platen 2 through the channel flow path 17. Those skilled in the art will readily appreciate that manual operation is only possible when no sheets are stacked in the deposit area 5. Thus, manual feed operation through flow path 17 requires that the deposit stack 5 be empty prior to manual introduction of a sheet.

Figure 2:
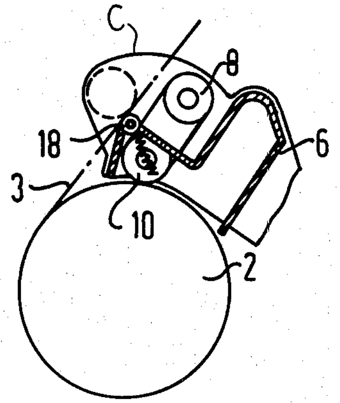
FIG. 2 is a partly schematic fragmentary cross-sectional side elevational view of a further embodiment of the sheet deposit arrangement according to the present invention in which transport rollers are mounted so as to be pivotal out of the transport path of the recording medium sheets.

In a further embodiment of the present invention illustrated in FIG. 2, spring-biased pressure roller means 18 are provided for the bias of sheets against the transport rollers, instead of the bias element construction 7 illustrated in FIG. 1. Further, the transport roller means 8 are arranged to be pivotable about the shaft of the drive rollers 10, for movement out of the path of recording medium 3 to the deposit stack 5, as shown in solid line fashion in FIG. 2. In such position, the automatic sheet deposit arrangement for the delivery of recording medium sheets 3 is disengaged.

The base wall 16 is preferably secured in the teletypewriter housing by means of releasable catch elements not shown. Thus, the deposit tray surface 16 can be easily removed to permit, for example, clear access to the platen 2 and carrier bracket C.

Although various minor modifications may be suggested by those versed in the art, it should be understood that we wish to embody within the scope of the patent warranted hereon all such modifications as reasonably and properly come within the scope of our contribution to the art.

We claim as our invention:

1. Apparatus for use in a printing device for depositing sheet-type recording media transported through a printing area over a platen into a deposit tray disposed above said platen having transport roller means arranged above said platen for seizing said recording medium after such has passed through said printing area and lifting such above a support wall serving as a lower ledge to said deposit tray, the improvement comprising a pivotably mounted carrier bracket in which said transport roller means and support wall are disposed in common, a stripper surface formed on said support wall for guiding said recording medium into engagement with said transport roller means, and a bias means disposed at said stripper surface for resiliently pressing said recording medium into frictional engagement with said transport roller means.

2. The improvement of claim 1, further including drive roller means beneath said transport roller means and operatively connected with said transport roller means for rotating said transport roller means, said carrier bracket being supported in free resting fashion on said drive roller means spaced from a pivot axis for said carrier bracket.

3. The improvement of claim 1, wherein said transport roller means is mounted for pivotal movement into and out of the path of said recording medium to said deposit tray.

4. The improvement of claim 1, wherein said bias means comprises spring-biased pressure rollers.

5. The improvement of claim 1, further including intake channel means for manual introduction of recording medium sheets to said platen from said deposit tray when empty, said intake channel means comprising a guidance surface formed on said support wall spaced across from a base wall of said deposit tray.

6. The improvement of claim 1, further including releasable locking means for preventing pivotal movement of said carrier bracket during passage of recording medium through said printing area.

7. The improvement of claim 6, wherein said locking means comprises resiliently supported latch elements and cooperatively arranged stop surfaces formed on said carrier bracket.

8. The improvement of claim 6, wherein said transport roller means is mounted for pivotal movement into and out of the path of said recording medium to said deposit tray.

9. The improvement of claim 1, wherein a base wall portion of said deposit tray extends upwardly from said platen, said base wall having on one side a channel extending therethrough from said deposit tray for guidance of individual recording medium sheets manually directed to said platen when said deposit tray is empty and on the other side a directing surface for guidance of recording medium sheets to said platen from an automatic sheet feed mechanism.

* * * * *